Oct. 31, 1944.   A. L. BRIGGS   2,361,529
MACHINE MOUNTING
Filed Nov. 6, 1941
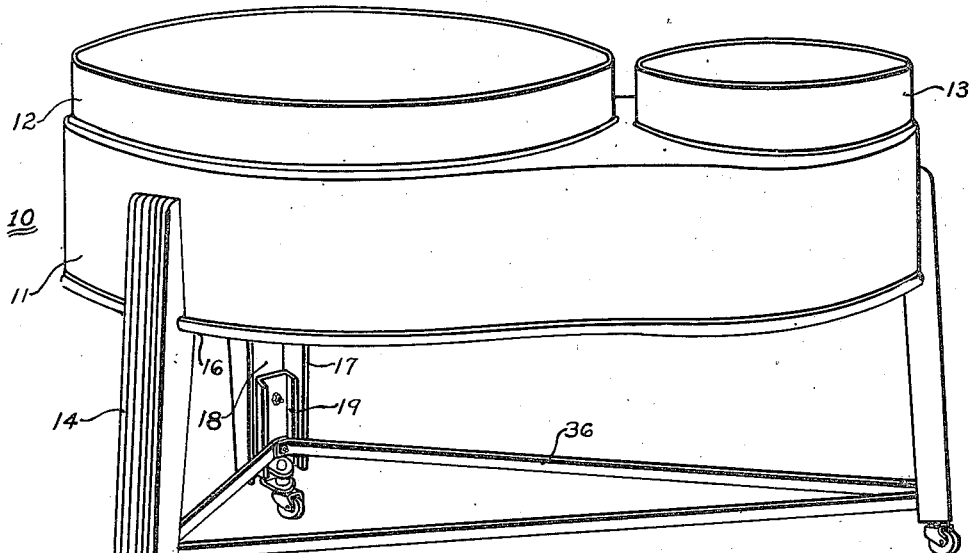
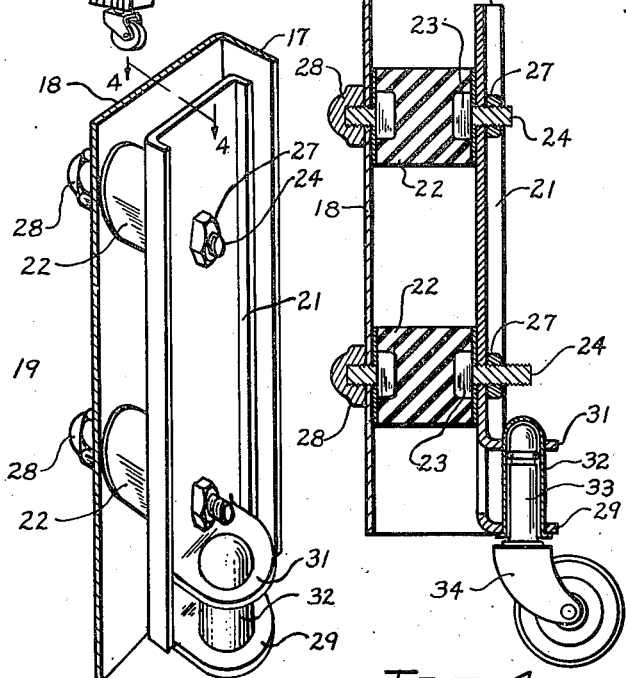
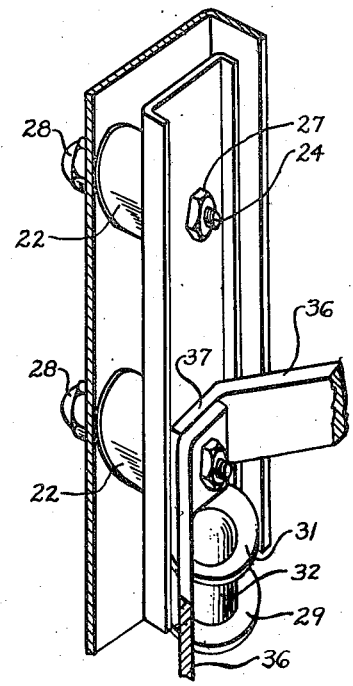
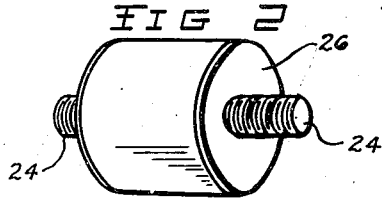
Inventor
Allan L. Briggs Patented Oct. 31, 1944

2,361,529

UNITED STATES PATENT OFFICE 2,361,529

MACHINE MOUNTING

Allan L. Briggs, Jamestown, N. Y., assignor to Blackstone Corporation, Jamestown, N. Y., a corporation of New York Application November 6, 1941, Serial No. 418,055

3 Claims. (Cl. 248—24)

This invention relates to an improved mounting for machines and more particularly to a mounting for absorbing vibrations that may occur during use of such machines.

The invention in one form, by way of illustration, is applied to a laundry device and more particularly to a combined washing and drying machine. When embodied in a machine of this nature it provides a shock and vibration absorbing zone for the purpose of reducing or entirely eliminating the vibrations of such a machine being transferred through the legs or other mounting thereof to the floor.

In laundry machines, and particularly those having dryers, the dryer takes the form of a basket adapted to be filled with wet material and rapidly rotated to extract moisture from the material. It is impractical to uniformly distribute the material within the basket, and thus, with such uneven distribution, considerable vibration occurs during the extraction operation. If the machine is supported on conventional legs or knobs, vibration set up during extraction causes such oscillations as to produce worn areas in the floor on which it rests. To facilitate moving the machine into and out of places of use, casters are sometimes provided and in such cases vibration of the extractor basket causes the machine to creep about, the casters producing further worn areas or track-like grooves in the floor.

An object of the present invention is to provide means in the leg or other mounting structure of a machine for absorbing shocks and vibrations occurring during operation of the machine, thereby preventing such vibrations from being transmitted to that portion of the mounting in contact with the floor.

Another object of the invention is to provide a resilient area in the supporting structure of a machine. Additionally, it is an object of the invention to provide means that is separately applicable to one or more supporting legs of a machine for the purpose of damping vibrations of the machine during use, and it is contemplated that this damping means may take the form of a carriage on which is supported the leg or other mounting structure of a machine. Other objects and advantages of the invention will be more fully understood from a consideration of the following specification, taken in conjunction with the accompanying drawing; and in which Figure 1 is a perspective view of a machine mounted on a structure embodying one form of the invention;

Figure 2 is an enlarged perspective view of one of the mounting units, a part of the machine leg structure being broken away for convenience of illustration;

Figure 3 is a view similar to Figure 2 showing the means employed to connect two or more mounting units;

Figure 4 is a vertical sectional view through one of the units, being taken substantially as indicated on line 4—4 of Figure 2; and Figure 5 is a perspective view of one of the resilient elements that forms a part of each unit.

Reference is now had to the drawing wherein the numeral 10 is employed to generally designate a laundering machine to which one form of the invention may be applied. The machine comprises a base 11 on which is supported, in any suitable manner, a washing machine tub 12 and an enclosure 13 in which to locate a dryer basket (not shown).

The base 11, in the present instance, is supported by three legs 14, each leg including a shoulder portion 16 on which the lower edge of the base 11 rests. Beneath the shoulder portion 16 the leg 14 is of channel shape, having side flanges 17 connected by base wall 18. The manner of attaching the leg 14 to the base 11 forms no part of the present invention and, therefore, is neither shown nor described.

In the lower end of the channel shaped leg 14 is located a unit 19. This unit comprises a channel member 21 and resilient blocks 22. In the present instance, the blocks are of pre-formed rubber, in the ends of which are embodied the heads 23 of bolts 24. The ends of the block are protected by plates 26 through which the threaded portion of bolts 24 project. The block 22 constitutes a resilient spacer and mounting for the channel member 21, one of the bolts 24 projecting through a suitable aperture in the base wall of the channel member 21 and secured by a nut 27, and the other bolt projecting through a suitable opening in the base wall 18 of the leg channel and fitted with a nut 28. In the present disclosure two resilient blocks are shown, but it is evident that a greater or lesser number of these blocks would be utilized with any substantial difference in size and weight of the machine and corresponding change in size of channel member 21.

The lower end of the base wall of the channel member 21 is bent at right angles to form a flange 29. A further flange 31 may be struck out from the base wall of this channel member and concentric openings in these flanges receive a socket 32 into which the shaft 33 of a conventional caster 34 projects.

A resilient mounting of the type shown may be applied to one or all the leg or other mounting structures of a machine. In the event all of the legs are so provided, it will be found desirable to tie or secure these mountings together to provide an undercarriage for the machine. In the disclosure of Figures 1 and 3 such structure is contemplated. Suitable straps 36 extend from one unit 19 to the next, being connected therewith at their overlapping flanged ends 37 by elongated bolts 24. By rigidly connecting the units 19, it is possible to prevent independent and opposed leg or mounting reaction to vibrations of the machine, and thus more fully and effectually prevent transmission of the machine vibrations to the casters 34 or their equivalent.

Although applicant has shown and described only one particular use and form of the invention, it will be understood that variations in the structure, as may be required in the application to other machines, are contemplated insofar as such variations are within the spirit and scope of the invention as set forth in the annexed claims.

Having thus set forth my invention what I claim as new and for which I desire protection by Letters Patent is:

1. A supporting structure for the legs of a machine comprising members of a number corresponding with the number of legs of said machine, straps having their ends secured to and rigidly connecting all of said members, resilient spaced apart blocks carried by each of said members, said blocks being joined to the legs of said machine and constituting the sole support of said machine as well as providing spaced areas for the absorption of vibration as between individual legs of said machine and each of said members.

2. A floor support for a machine leg or similar mounting comprising a unit in close proximity with the lower end of said leg, at least two resilient members interposed between said leg and said unit, means carried by and made integral with the ends of said members for joining said leg to said unit, said members being so spaced apart as to provide areas of vibration absorption at different points on said leg.

3. A supporting structure for a machine comprising units of a number corresponding with the number of legs of said machine, each unit being in close proximity with the lower end of a leg, at least two resilient blocks being interposed between a leg and the corresponding unit and including means rigidly joining the blocks to the leg and unit, straps rigidly connecting each unit with the next adjacent unit, said straps being engaged with each of said units immediately adjacent the lowermost resilient block, the blocks of each unit being of sufficient spacing to provide areas of vibration absorption at different points on said leg.

ALLAN L. BRIGGS.